Dec. 27, 1927.
W. J. FRANCKE
1,654,495
TESTING MACHINE
Filed March 1, 1922
3 Sheets-Sheet 1
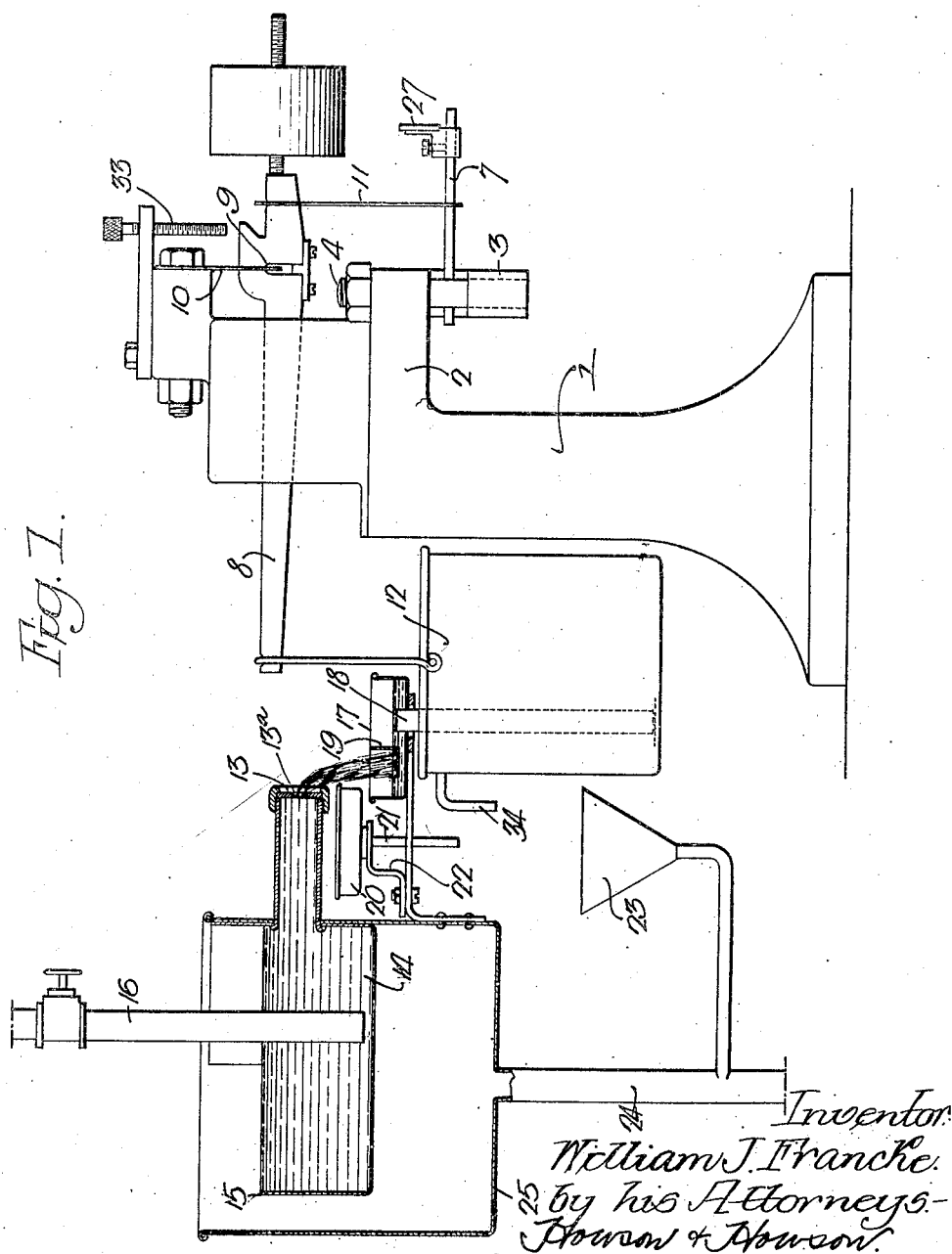

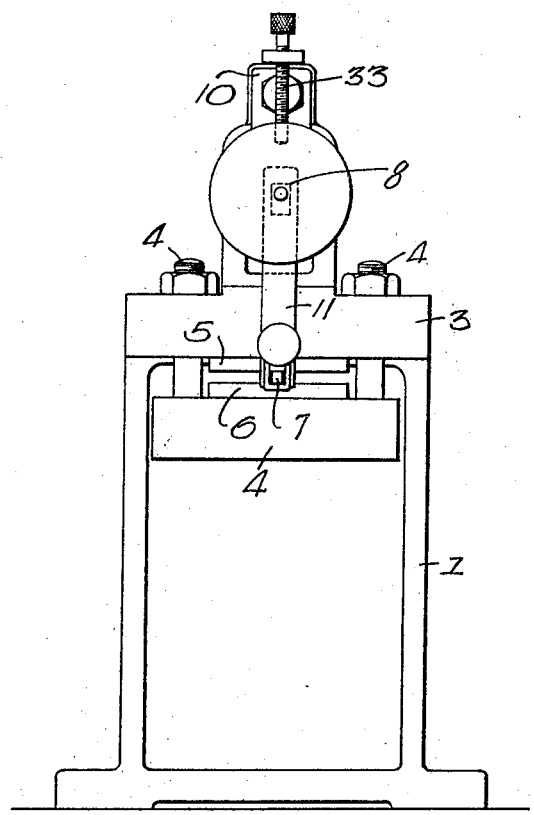

Dec. 27, 1927. 1,654,495
W. J. FRANCKE
TESTING MACHINE
Filed March 1, 1922 3 Sheets-Sheet 3
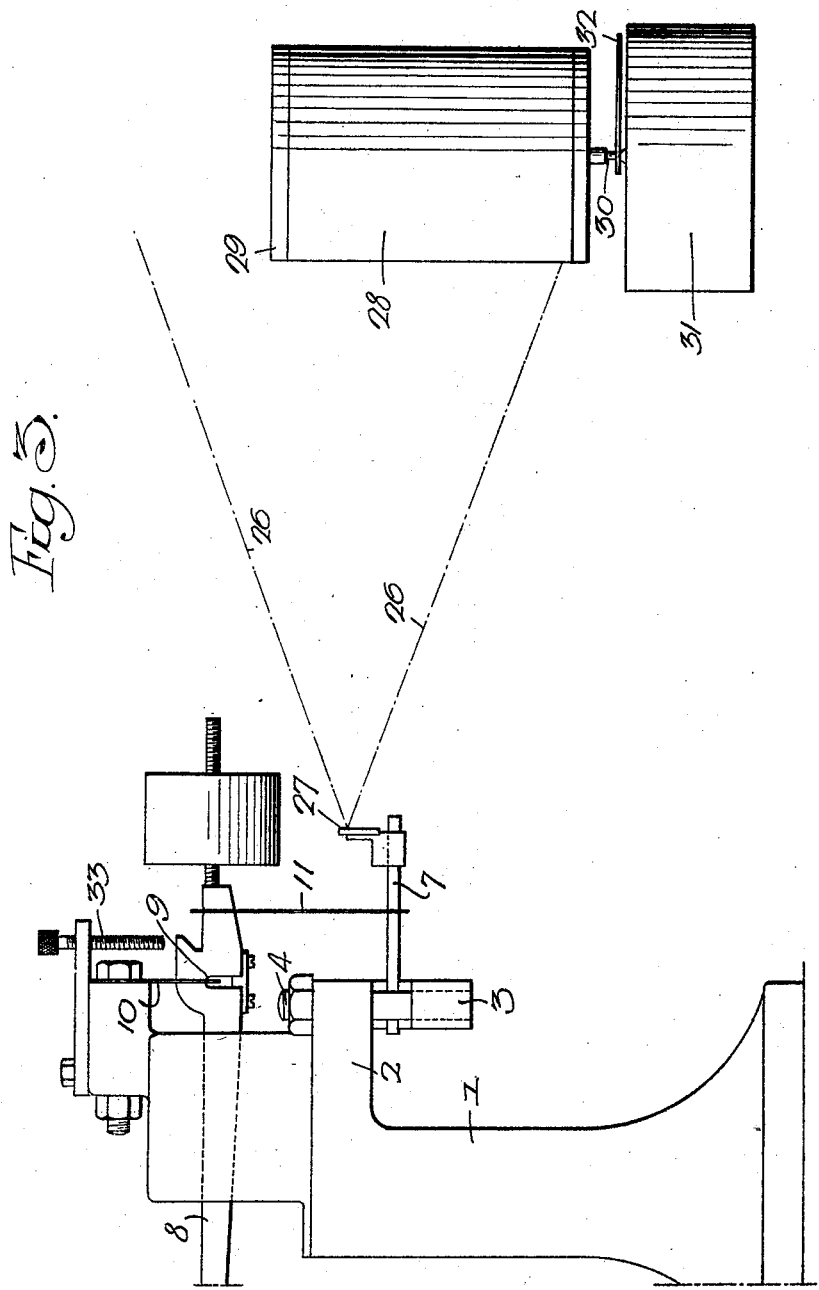
Inventor.
William J. Francke.
by his Attorneys.
Howson & Howson Patented Dec. 27, 1927.

1,654,495

UNITED STATES PATENT OFFICE.

WILLIAM J. FRANCKE, OF NEW BRUNSWICK, NEW JERSEY; ALLEN E. BEALS, OF PLAINFIELD, RICHARD G. SAVOYE, OF WESTFIELD, AND RUSSELL E. WATSON, OF HIGHLAND PARK, NEW JERSEY, EXECUTORS OF SAID WILLIAM J. FRANCKE, DECEASED.

TESTING MACHINE.

Application filed March 1, 1922. Serial No. 540,324.

This invention relates to machines for testing the quality of metals and other specimens by determining the deformation that takes place in their structure under strain, the object of the invention being to provide means for obtaining measurements of the slight deformations of the specimen below the yield point.

A further object is to provide means whereby the load applied to the specimen may be increased uniformly and continuously regardless of the deformation of the specimen.

In the attached drawings:

Figure 1 is a side elevation more or less diagrammatic of a testing machine made in accordance with my invention;

Fig. 2 is a front elevation of the testing mechanism, and

Fig. 3 is a fragmentary side elevation of the testing machine showing the recording apparatus.

In testing machines now in general use, it is customary to apply the load to the specimen by means of a screw or hydraulically by means of a pump. In either case, the load causing deformation becomes less the instant that there occurs in the specimen a permanent yield. In order to maintain the load at a uniform value or uniformly increasing value, it will be necessary under these conditions to speed up the screw or the pump in exact ratio with the yielding of the specimen, which is practically impossible. The result of this temporary diminishing of the load at the moment the specimen yields is that the extent of the yield is reduced to a minimum, and as a result is so minute that it is not recorded or measured by the extensometer employed for that purpose. The yields or deformations which take place below the yield point or elastic limit or, as present designated in the act of testing, the proportionality limit, are so slight if the pressure is released even temporarily, that the extensometer cannot measure them. If the pressure is maintained, however, these slight yieldings may be increased in value to a point where measurements to one ten-thousandths of an inch or less will record and measure them. In other words, if the load applied is a uniformly increasing one, without release of the load as the specimen yields to it, the deformation is increased by the increasing load to a point where deformations so slight as to pass unobserved in the present methods of testing may be measured.

I have discovered means whereby a uniformly increasing load may be applied to the specimens, the load remaining uniformly increasing regardless of the deformation of the specimen caused by the load, and have further discovered means whereby the deformations within the elastic limit may be accurately measured and recorded.

With reference to the drawings, the apparatus employed comprise a base structure 1 having a forward extension 2 which constitutes the upper fixed jaw of a vise, the lower movable jaw of which is indicated by the reference numeral 3. The lower jaw 3 in the present instance is supported from the fixed jaw 2 by means of bolts 4, 4, which bolts also provide means for bringing the jaws together. Held in the vise 2—3 is an auxiliary vise comprising an upper fixed jaw 5 and lower movable jaw 6, between which latter jaws is held the specimen under test, I, in the present instance, having indicated this specimen in the form of a bar 7, one end of which is held between the jaws 5—6 and the other extending forwardly, as best shown in Figs. 1 and 2.

Pivotally mounted at the top of the support structure 1 is a lever arm 8 fulcrumed in the present instance at 9, said arm being suspended at this point from the supporting structure by means of a supporting element 10. A link 11 extends over the top of the arm 8, and under the specimen 7, and provides means whereby engagement of the lever around its fulcrum causes a deflection of the specimen. At the rear end of the lever arm 8 is slung a container 12 adapted to receive water or other fluid constituting the deflecting load.

In order to insure a uniformly increasing load, the water or other fluid is metered to the bucket 12 by means of an orifice 13$^a$ in the thin plate 13 constituting a portion of the side of a receptacle or reservoir 14, in which reservoir the head is maintained constant by a weir 15 at the rear of the reservoir, the water or fluid being supplied to the reservoir in a volume greater than that discharging through the orifice through a supply pipe 16.

As shown in Fig. 1, the jet of water issuing from the orifice 13ª enters a receptacle 17 overlying the receptacle 12, and having an overflow pipe 18 extending down to or near the bottom of the receptacle 12, there being provided in the receptacle 17 a baffle plate 19 adapted to receive against itself the water from the orifice whereby an entirely even flow of water through the overflow is obtained. Means is also provided, in the form of a trough 20 mounted eccentrically upon a stem 21, which latter is pivotally mounted in a bracket 22, for interrupting the flow of water into the receptacle 17, the interruption being accomplished by rotating the trough until the eccentric or offset end underlies the jet of liquid passing from the orifice. The water thus received in the trough 20 passes through the stem 21, which is hollow, and into a receptacle 23, from whence it is carried to the waste pipe 24, which latter extends from the bottom of a casing 25, surrounding the reservoir 14, and receiving the excess water which overflows from this latter reservoir.

The deformation, deflection in the present instance, of the specimen is recorded by means of a beam of light, indicated by the reference numeral 26 in Fig. 3, which latter is reflected from a mirror 27 fixed to the end of the specimen 7. This beam is taken from any suitable source (not shown) and reflected onto the surface of a sensitized photographic film 28 carried by the revolving drum 29. The drum 29 is rotated by clockwork, it being shown in the present instance attached to the minute hand stem 30 of a clock 31, the minute hand of the clock being indicated by the reference numeral 32. The rate of flow of the liquid through the orifice 13ª into the receptacle 12 may be ascertained by test, and the load on the specimen computed for any moment from the position of the minute hand at that time.

The test may be stopped at any instant by means of the trough 20 as previously described, and the load released by means of the screw 33, the specimen being allowed to spring back to a position of rest and thereby permitting measurement of the set, this latter being also indicated and recorded on the sensitized film by the beam of light 26.

It will be noted that an overflow pipe 34 has been provided in the receptacle 12 whereby the entire test process is made automatic, the position of the overflow pipe 34 in the receptacle determining the conclusion of this test by stopping the uniform increase of the load.

Although I have illustrated my invention with but one form of apparatus, it will be understood that considerable modification of this apparatus to suit varying conditions and the type of stress desired to be put upon the specimen may be made with no departure from the essential features of the invention.

I claim:

1. In a testing machine, the combination with specimen-retaining means, of means for applying a load in the form of a weight supported entirely by the specimen, and means for continuously and uniformly changing the weight to vary the load in predetermined manner.

2. In a testing machine, the combination with specimen-retaining means, of means for applying a load to said specimen comprising a receptacle, and means for passing a liquid into said receptacle at a uniform rate.

3. In a testing machine, the combination with specimen-retaining means, of means for applying a load to said specimen comprising a receptacle, a reservoir, and means for obtaining a constant and uniform flow of liquid from the reservoir to the receptacle.

4. In a testing machine, the combination with specimen-retaining means, of means for applying a load to said specimen comprising a reservoir having an orifice, a receptacle adapted to receive a liquid discharged from said orifice, and means for maintaining the liquid in said reservoir at a constant head.

5. In a testing machine, the combination with specimen-retaining means, of means for applying a load to said specimen comprising a main receptacle, a reservoir and an intermediate receptacle adapted to receive liquid discharge from said reservoir, an overflow duct from said intermediate receptacle extending to the bottom of the said main receptacle, and means for maintaining a constant and uniform flow of liquid from the reservoir to the intermediate receptacle.

6. In a testing machine, the combination with specimen-retaining means, of means for applying a load to said specimen comprising a main receptacle, a reservoir and an intermediate receptacle, means for maintaining a constant and uniform flow of liquid from the reservoir to the intermediate receptacle, an overflow duct in said intermediate receptacle extending to the bottom of the main receptacle, and a baffle plate extending below the surface of the liquid in the intermediate receptacle and intermediate the point where the liquid enters the said receptacle from the reservoir and the said overflow duct.

7. In a testing machine, the combination with specimen-retaining means, of means for applying a load in the form of a weight supported entirely by the specimen, means for continuously and uniformly changing the weight to vary the load, and means for interrupting said weight-changing means.

8. In a testing machine, the combination with specimen-retaining means, of means for applying a load to said specimen comprising a receptacle, means for obtaining a constant and uniform flow of material into said receptacle, and means for interrupting said flow.

9. In a testing machine, the combination with specimen-retaining means, of means for applying a load in the form of a weight supported entirely by the specimen, means for continuously and uniformly changing the weight to vary the load in predetermined manner, and means for determining the amount of said load at any moment.

10. In a testing machine, the combination with specimen-retaining means, of means for applying a load in the form of a weight supported entirely by the specimen, means for continuously and uniformly changing the weight at a predetermined rate to vary the load accordingly, and means for determining the periods of operation of said weight-changing means.

11. In a testing machine, the combination with specimen-retaining means, of means for applying a load in the form of a weight supported entirely by the specimen, means for continuously and uniformly increasing the amount of said weight to vary the load accordingly, and means for determining the amount of said load at any moment without interrupting the continuity of application.

12. In a testing machine, the combination with specimen-retaining means, of means for applying a load in the form of a weight supported entirely by the specimen, means for continuously and uniformly changing the weight to vary the load accordingly, and means for obtaining a continuous record of the distortion of said specimen under said load.

13. In a testing machine, the combination with specimen-retaining means, of means for applying a load in the form of a weight supported entirely by the specimen, means for continuously and uniformly increasing the weight to vary the load accordingly, and means for determining the distortion of said specimen at any desired moment.

14. In a testing machine, the combination with specimen-retaining means, of means for applying a load in the form of a weight supported entirely by the specimen, means for continuously and uniformly increasing the amount of said weight to vary the load accordingly, and means for obtaining a graphic record of the distortion of said specimen under the increasing load.

15. In a testing machine, the combination with specimen-retaining means, of means for applying a load to said specimen, means for continuously and uniformly varying said load, a mirror, means for moving said mirror in timed relation with said specimen, a source of light, and a uniformly moving and sensitized element adapted to receive a beam of light reflected from the source by the mirror.

16. In a testing machine, the combination with specimen-retaining means, of means for applying a load to said specimen, means for continuously and uniformly varying said load at a predetermined rate, an element movable with respect to the specimen, means for uniformly moving said element at a predetermined rate of speed, and means including said element for obtaining a graphic record of the distortion of said specimen.

17. In a testing machine, the combination with specimen-retaining means, of means for applying a load to said specimen, means for continuously and uniformly varying said load at a predetermined rate, a drum, means for rotating said drum at a predetermined rate of speed, said drum being adapted to retain thereon a light sensitive element, a source of light, and a mirror carried by said specimen and adapted to reflect said light from the source onto the said light sensitive element.

18. The method of testing, which comprises applying to a specimen a load in the form of a weight supported entirely by the specimen, continuously and uniformly changing the weight to vary the load accordingly, and making a continuous record of the distortion of the specimen under said varying load.

19. The method of testing, which comprises applying to a specimen a load in the form of a weight supported entirely by the specimen, continuously and uniformly increasing the weight at a predetemined rate to vary the load accordingly, and observing the distortion of said specimen under the increasing load.

20. The method of testing, which comprises applying to a test specimen a load in the form of a weight supported entirely by the specimen, continuously increasing the weight at a predetermined uniform rate, and timing the period during which the load is applied to the specimen.

21. In a testing machine, the combination with specimen-retaining means, of means including a gravity-actuated member for applying a load to said specimen, and means for continuously and uniformly increasing the weight of said member.

22. The method of testing, which comprises applying to a specimen a load in the form of a gravity-actuated member, and continuously and uniformly increasing the weight of said member.

WILLIAM J. FRANCKE.